US012045655B2

(12) United States Patent
Zonca et al.

(10) Patent No.: US 12,045,655 B2
(45) Date of Patent: Jul. 23, 2024

(54) ASSISTING PROGRESSIVE CHUNKING FOR A DATA QUEUE BY USING A CONSUMER THREAD OF A PROCESSING DEVICE

(71) Applicant: RED HAT, INC., Raleigh, NC (US)

(72) Inventors: Daniele Zonca, Vignate (IT); Francesco Nigro, Gorgonzola (IT)

(73) Assignee: RED HAT, INC., Raleigh, NC (US)

( * ) Notice: Subject to any disclaimer, the term of this patent is extended or adjusted under 35 U.S.C. 154(b) by 317 days.

(21) Appl. No.: 17/325,534

(22) Filed: May 20, 2021

(65) Prior Publication Data

US 2022/0374270 A1 Nov. 24, 2022

(51) Int. Cl.
*G06F 9/50* (2006.01)
*G06F 9/46* (2006.01)

(52) U.S. Cl.
CPC ............ *G06F 9/5016* (2013.01); *G06F 9/466* (2013.01)

(58) Field of Classification Search
CPC ........ G06F 9/5016; G06F 9/466; G06F 3/061; G06F 3/0671; G06F 3/064; G06F 3/0656
See application file for complete search history.

(56) References Cited

U.S. PATENT DOCUMENTS

| 8,938,598 | B2 | 1/2015 | Jones | |
|---|---|---|---|---|
| 10,782,970 | B1 | 9/2020 | Nigro | |
| 2003/0120852 | A1* | 6/2003 | McConnell | G06F 13/385 710/316 |
| 2008/0066066 | A1* | 3/2008 | MacPherson | G06F 9/5027 718/100 |
| 2013/0262718 | A1* | 10/2013 | Vasudevan | H04L 49/90 710/54 |

(Continued)

FOREIGN PATENT DOCUMENTS

| CN | 106648898 A | 5/2017 | |
|---|---|---|---|
| CN | 109508235 A | * 3/2019 | ........... G06F 9/5016 |

(Continued)

OTHER PUBLICATIONS

Ou, CN109508235A Description Translation, Mar. 22, 2019, [database online], [retrieved on May 27, 2023] Retrieved from Espacenet using Internet <URL:https://worldwide.espacenet.com/publicationDetails/description?CC=CN&NR=109508235A&KC=A&FT=D&ND=3&date=20190322&DB=&locale=en_EP>, pp. 1-24 (Year: 2019).*
Ostrovsky et al. Scaling Concurrent Queues by Using HTM to Profit from Failed Atomic Operations, Feb. 22-26, 2020, <https://dl.acm.org/doi/pdf/10.1145/3332466.3374511> (Year: 2020).*

(Continued)

*Primary Examiner* — Meng Ai T An
*Assistant Examiner* — Hsing Chun Lin
(74) *Attorney, Agent, or Firm* — Kilpatrick Townsend & Stockton LLP

(57) ABSTRACT

Consumer threads can assist in performing progressive chunking for a data queue. For example, a consumer thread can determine a current-chunk identifier indicating a current memory chunk of an unbounded queue, where the current memory chunk is associated with a producer thread that is different from the consumer thread. The consumer thread can determine a target-chunk identifier indicating a target memory chunk to which the producer thread is to write a data item. In response to determining that the target-chunk identifier is greater than the current-chunk identifier, the consumer thread can append a new memory chunk to the unbounded queue for use as the target memory chunk by the producer thread.

19 Claims, 4 Drawing Sheets

(56) References Cited

U.S. PATENT DOCUMENTS

2020/0319941 A1    10/2020    Sharique

FOREIGN PATENT DOCUMENTS

CN          107239343  B      10/2020
CN          112148488  A   *  12/2020

OTHER PUBLICATIONS

Zhou, CN112148488A, Dec. 29, 2020, <https://worldwide.espacenet.com/publicationDetails/description?CC=CN&NR=112148488A&KC=A&FT=D&ND=3&date=20201229&DB=&locale=en_EP> (Year: 2020).*

Aldinucci, M., et al., "An Efficient Unbounded Lock-Free Queue for Multi-core Systems," Euro-Par, 2012, https://link.springer.com/content/pdf/10.1007/978-3-642-32820-6_65.pdf.

Barrington, A., et al., "A Scalable Multi-Producer Multi-Consumer Wait-Free Ring Buffer," University of Central Florida, Apr. 13-17, 2015, https://dl.acm.org/doi/abs/10.1145/2695664.2695924.

U.S. Appl. No. 16/863,551, filed Apr. 30, 2020, Applicant: Red Hat, Inc., Francesco Nigro et al.

U.S. Appl. No. 17/085,517, filed Oct. 30, 2020, Applicant: Red Hat, Inc., Francesco Nigro et al.

* cited by examiner

ASSISTING PROGRESSIVE CHUNKING FOR A DATA QUEUE BY USING A CONSUMER THREAD OF A PROCESSING DEVICE

TECHNICAL FIELD

The present disclosure relates generally to data queues in memory devices. More specifically, but not by way of limitation, this disclosure relates to assisting progressive chunking for a data queue by using a consumer thread of a processing device.

BACKGROUND

Computer systems can include one or more processing devices that read and write data items in memory based on requests from software programs, such as middleware that lays between an operating system and an application running on the operating system. The processing devices use processing threads to perform the reading and writing. The processing threads may be hardware threads of a processing core or software threads created by a program. In particular, the processing devices can use producer threads to write data items to a data queue stored in memory and can use consumer threads to read the data items from the data queue. The producer threads and consumer threads can be referred to as producers and consumers, respectively. In a multi-processor/multi-core system, multiple consumer threads and producer threads can be executed in parallel to concurrently read and write data items in the data queue, respectively. Thus, the data queue can be considered a concurrent queue because multiple processing threads read and write data items in the data queue concurrently.

Data items may be stored in any suitable type of data queue. For example, the data queue can be a first-in-first-out (FIFO) queue or a last-in-first-out ("LIFO") queue. The data queue may be an unbounded queue in that it has an adjustable size, rather than a fixed size, to accommodate more data items. For example, the data queue's size can be expanded to accommodate additional data items by progressively appending memory chunks ("chunks") to the end of the data queue. The process of progressively appending memory chunks to a data queue can be referred to as progressive chunking.

DETAILED DESCRIPTION

Figure 1:
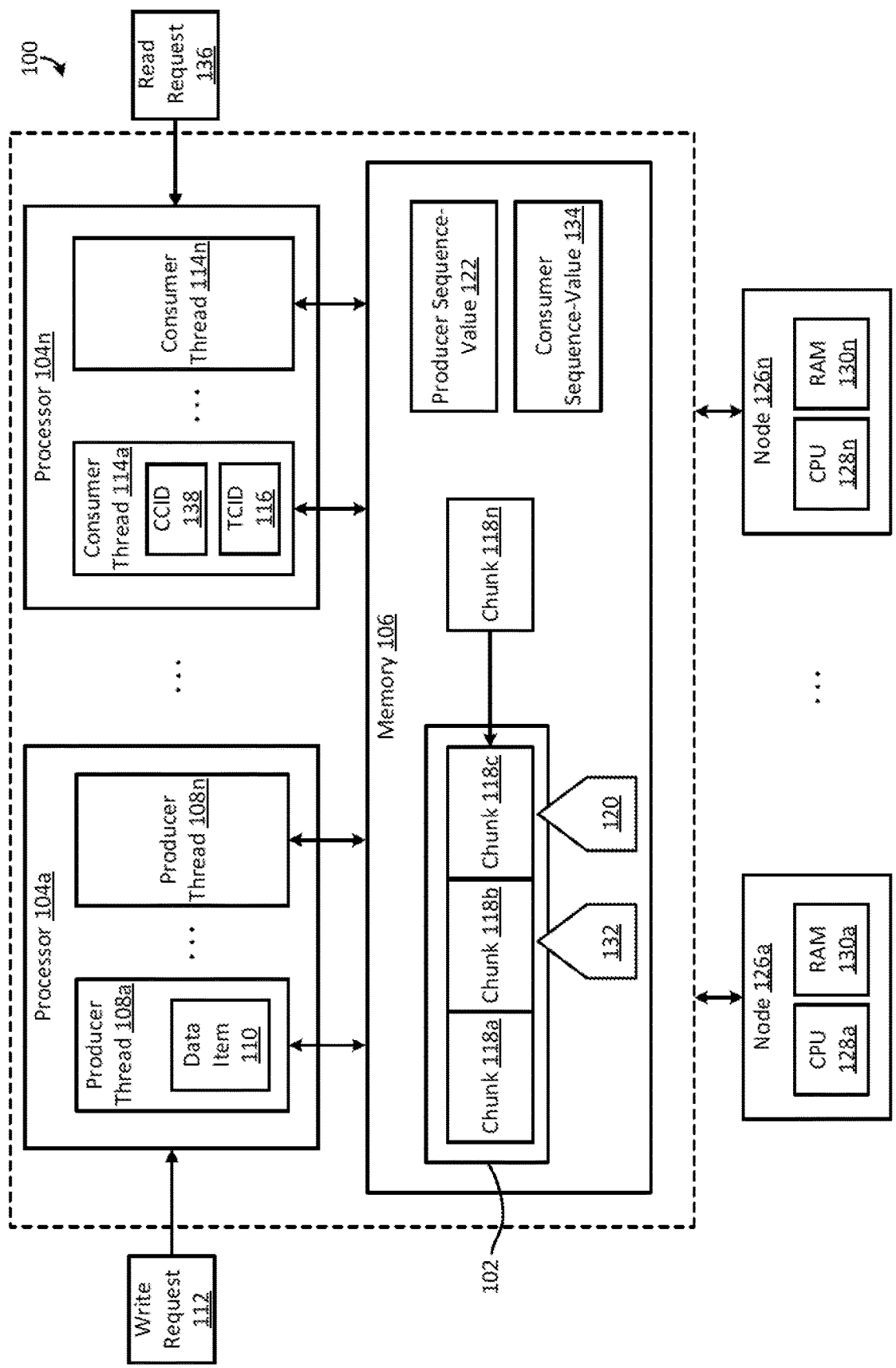
FIG. 1 is a block diagram of an example of a system for implementing consumer-assisted progressive chunking for a data queue according to some aspects of the present disclosure.

Computer systems can include one or more processing devices that use producer threads to write data items to a data queue and consumer threads to read data items from the data queue. If a producer thread needs to write a data item to the data queue when the last offered chunk is full, the producer thread can append a memory chunk to the end of the data queue to create space for the data item. The process of progressively appending memory chunks to a data queue can be referred to as progressive chunking. Existing systems that implement progressive chunking do so on the producer side, because the producer threads know when and how much new data is to be written to the data queue. But this can cause collisions on the producer side. For example, multiple producer threads may concurrently try to append memory chunks to the data queue leading to a collision. This collision may cause a blocking event on the producer side in which at least one of the producer threads is blocked from appending a memory chunk to the data queue. To resolve this issue, the blocked producer threads may wait for a period of time before retrying to append the memory chunks to the data queue. Alternatively, the blocked producer threads may retry to append the memory chunks immediately. Either way, additional collisions and blocking may result. The added wait times and blocking generated by such collisions can result in increased latency and decreased throughput of the system.

Some aspects and features of the present disclosure can overcome one or more of the abovementioned problems by allowing the consumer threads to assist in the progressive chunking process. For example, if a producer thread is blocked from appending a memory chunk to the data queue due to a collision, a consumer thread can append the memory chunk to the data queue on behalf of the producer thread. This can allow the progressive chunking process to continue so that the producer thread can write its data items to the appended memory chunk with reduced delay, thereby improving the throughput of the system.

More specifically, the consumer thread can determine whether a new memory chunk is to be appended to a data queue for use by a producer thread and, if so, append the memory chunk to the data queue. For example, the consumer thread can determine a current-chunk identifier that indicates a current memory chunk (of the data queue) that is associated with the producer thread. The consumer thread can also determine a producer sequence-value associated with the producer thread. The producer sequence-value can identify a particular write request transmitted to the producer thread for writing a particular data item to the data queue. Based on the producer sequence-value, the consumer thread can determine a target-chunk identifier. The target-chunk identifier can indicate a target memory chunk to which the producer thread is to write the particular data item associated with the producer sequence-value. The consumer thread can then compare the current-chunk identifier to the target chunk-identifier. If the target-chunk identifier is greater than the current-chunk identifier, it may mean that the producer thread is supposed to write the particular data item to a target memory chunk that does not yet exist in the data queue. So, the consumer thread can append a new memory chunk to the data queue for use as the target memory chunk by the producer thread. In this way, the consumer thread can assist the producer thread by appending the new memory chunk to the data queue. After the new memory chunk has been appended to the data queue, the producer thread can then write the particular data item to the new memory chunk.

In some examples, the new memory chunk that is appended to the data queue (by the consumer thread) may be a memory chunk that is newly allocated to the data queue. That is, the new memory chunk may be a memory chunk that was not previously part of the data queue. In other examples, the new memory chunk may be a reused memory chunk from a pool of memory chunks previously assigned to the data queue. For example, the data queue can include multiple memory chunks, where each memory chunk can include multiple slots for storing data items. A consumer thread can read the slots of a memory chunk in their sequential order. Upon reading each slot of the memory chunk, the consumer thread may overwrite the slot with "NULL" or another value to indicate that the slot is empty or has been read. Once all of the slots in the memory chunk have been read, the consumer thread may make the memory chunk available for reuse in the progressive chunking process. For example, the consumer thread can mark the memory chunk as available or detach the memory chunk from the data queue. In one such example, the data queue may be a linked list of memory chunks and detaching a memory chunk from the data queue may involve removing the memory chunk from the linked list. In this way, a memory chunk can be recycled for use in the data queue once all of its contents have been read.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 implementing consumer-assisted progressive chunking for a data queue 102 according to some aspects of the present disclosure. The system 100 can include any number of processors 104a-n, such as physical processors or virtual processors (e.g., of virtual machines). Each of the processors 104a-n can include one or more cores for executing one or more processing threads, such as producer threads 108a-n and consumer threads 114a-n. The processing threads can be hardware threads built into the processors 104a-n or software threads created by programs. The processing threads can include ordered sequences of instructions that allow the processors 104a-n to execute multiple instruction streams concurrently. For example, processor 104a may concurrently run two instruction steams on producer threads 108a-n.

The processors 104a-n may be part of or supported by one or more hardware processing devices that are located on any number and combination of nodes 126a-n. For example, the processors 104a-n may be cores of the processing devices located on the nodes 126a-n. Each of the nodes 126a-n may be a physical machine, such as a server or desktop computer, that includes one or more central processing units (CPUs) 128a-n, field-programmable gate arrays (FPGAs), or other processing devices on which the processing threads can execute.

The processors 104a-n can be communicatively coupled to one or more memories, which can be collectively referred to as memory 106. The memory 106 can include a physical memory or a virtual memory (e.g., of a virtual machine). The memory 106 can be part of or supported by one or more hardware memory devices that are located on any number and combination of the nodes 126a-n. For example, each of the nodes 126a-n can include one or more hard drives, random access memories (RAM) 130a-n, or other memory devices on which data can be stored.

Figure 2:
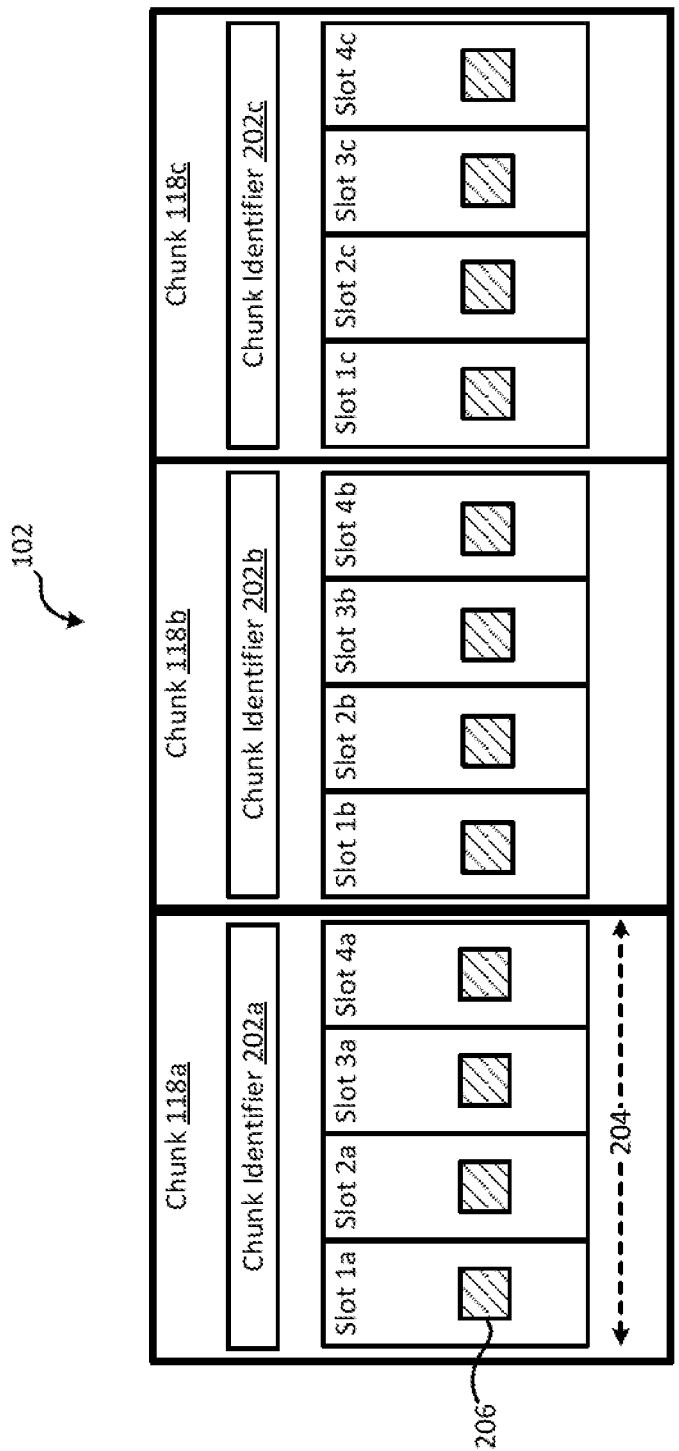
FIG. 2 is a block diagram of an example of a chunked queue according to some aspects of the present disclosure.

The memory 106 can include a data queue 102 formed from any number of memory chunks 118a-c ("chunks"), where a memory chunk can be a contiguous segment of memory 106. A more detailed example of the data queue 102 is shown in FIG. 2. As shown in FIG. 2, the data queue 102 includes memory chunks 118a-c that can each have a fixed size 204. An example of the fixed size of a memory chunk can be 1024 bytes. Each of the memory chunks 118a-c can include a fixed number of slots. A slot of a memory chunk can be a contiguous portion of memory for storing one or more data items, such as data item 206. The slots of a memory chunk are non-overlapping with one another in memory. Each of the slots may also have a fixed size, such as 256 bytes. Although FIG. 2 depicts four slots per memory chunk, other examples may involve different amounts of slots per memory chunk. In some examples, the memory chunks 118a-c can also include chunk identifiers 202a-c, where each chunk identifier uniquely identifies its corresponding memory chunk from the other memory chunks in the data queue 102.

Returning to FIG. 1, the producer side (e.g., the producer threads 108a-n) can include a producer sequence-value 122. The producer sequence-value 122 can be an integer value, such as a 64-bit integer or a counter value, that represents an identifier of a particular write request 112 received by the producer threads 108a-n. Some or all of the producer threads 108a-n may share the same producer sequence-value 122. The producer threads 108a-n may update (e.g., increment) the producer sequence-value 122 for each received write request, such that the current producer sequence-value corresponds to the most-recent write request 112 received by the producer threads 108a-n. The producer side can also include a producer buffer-value 120 indicating a current memory chunk (e.g., memory chunk 118c) for the producer threads 108a-n. The producer buffer-value 120 may be a pointer to the current memory chunk where the producer threads 108a-n are to offer data items. Some or all of the producer threads 108a-n may share the same producer buffer-value 120. The producer threads 108a-n can use the producer sequence-value 122 and the producer buffer-value 120 to coordinate among one another for storing data items in the data queue 102.

In some examples, the consumer side (e.g., the consumer threads 114a-n) can include a consumer sequence-value 134. The consumer sequence-value 134 can be an integer value, such as a 64-bit integer or a counter value, that represents an identifier of a particular read request 136 received by the consumer threads 114a-n. Some or all of the consumer threads 114a-n may share the same consumer sequence-value 134. The consumer threads 114a-n may update the consumer sequence-value 134 for each received read request, such that the current consumer sequence-value corresponds to the most-recent read request 136 received by the consumer threads 114a-n. The consumer side can also include a consumer buffer-value 132 indicating a current memory chunk (e.g., memory chunk 118b) for the consumer threads 114a-n. For example, the consumer buffer-value 132 may be a pointer to the current memory chunk where the consumer threads 114a-n are to read a next data item. Some or all of the consumer threads 114a-n may share the same consumer buffer-value 132. The consumer threads 114a-n can use the consumer sequence-value 134 and the consumer buffer-value 132 to coordinate among one another for reading data items from the data queue 102.

In some examples, a producer thread 108a may need to write a data item 110 to the data queue when the current memory chunk for the producer thread 108a is full. So, the producer thread 108a may attempt to append a new memory chunk 118n to the end of the data queue 102 for use in storing the data item 110. For example, the producer thread 108a may attempt to append the new memory chunk 118 to the current memory chunk if the current memory chunk is the last memory chunk 118c in the data queue 102. If multiple producer threads 108a-n attempt to append a memory chunk to the data queue 102 concurrently, it may cause collisions between some or all of the producer threads 108a-n that result in their appending operations being blocked. Such blocking may increase latency and decrease the throughput of the system 100.

To help overcome the blocking issue described above, in some examples the consumer threads 114a-n can execute a process that is configured to assist with appending new memory chunks to the data queue 102. In particular, the consumer thread 114a can obtain the producer sequence-value 122 from memory 106 and determine a target memory chunk for storing the data item 110 based on the producer sequence-value 122. For example, the consumer thread 114a can determine a target-chunk identifier 116 ("TCID") by dividing the producer sequence-value 122 by the number of slots per memory chunk (e.g., by four if there are four slots per memory chunk). In addition to determining the target-chunk identifier 116, the consumer thread 114a can obtain the producer buffer-value 120 from memory 106 and determine a current-chunk identifier 138 ("CCID") based on the producer buffer-value 120. For example, the current-chunk identifier 138 can be, or can be derived from, the producer buffer-value 120. The consumer thread 114a next compare the target-chunk identifier 116 to the current-chunk identifier 138. If the target-chunk identifier 116 is greater than the current-chunk identifier 138, it may mean that the producer thread 108a is supposed to write the particular data item 110 to a target memory chunk that does not yet exist in the data queue 102. So, the consumer thread 114a can append a new memory chunk 118n to the data queue 102 for use as the target memory chunk by the producer thread 108a. In this way, the consumer thread 114a can assist the producer thread 108a by appending the new memory chunk 118n to the data queue 102. The producer thread 108a may then be able to write the particular data item 110 to the new memory chunk 118n.

On the other hand, if the target-chunk identifier 116 is less than or equal to the current-chunk identifier 138, it may mean that the producer thread 108a is supposed to write the particular data item 110 to a memory chunk that already exists in the data queue 102. So, the consumer thread 114a may not append a new memory chunk 118n to the data queue 102 and the producer thread 108a may write the particular data item 110 to the data queue 102 without further assistance from the consumer thread 114a.

The above process can be repeated as desired. For example, the consumer thread 114a can repeat the above process at periodic intervals. As another example, the consumer thread 114a can automatically trigger the above process in response to detecting certain events, such as a blocking event on the producer side.

Although FIG. 1 depicts a certain number and arrangement of components for illustrative purposes, it will be appreciated that other examples may include more components, fewer components, different components, or a different arrangement of the components shown in FIG. 1. For example, the system 100 can include any number of nodes 126a-n with any number and combination of processing devices and memory devices, supporting any number and combination of processors 104a-n and memories 106 respectively. In addition, the processors 104a-n can execute any number and combination of producer threads 108a-n and consumer threads 114a-n for writing and reading any number and combination of data items in the data queue 102.

Figure 3:
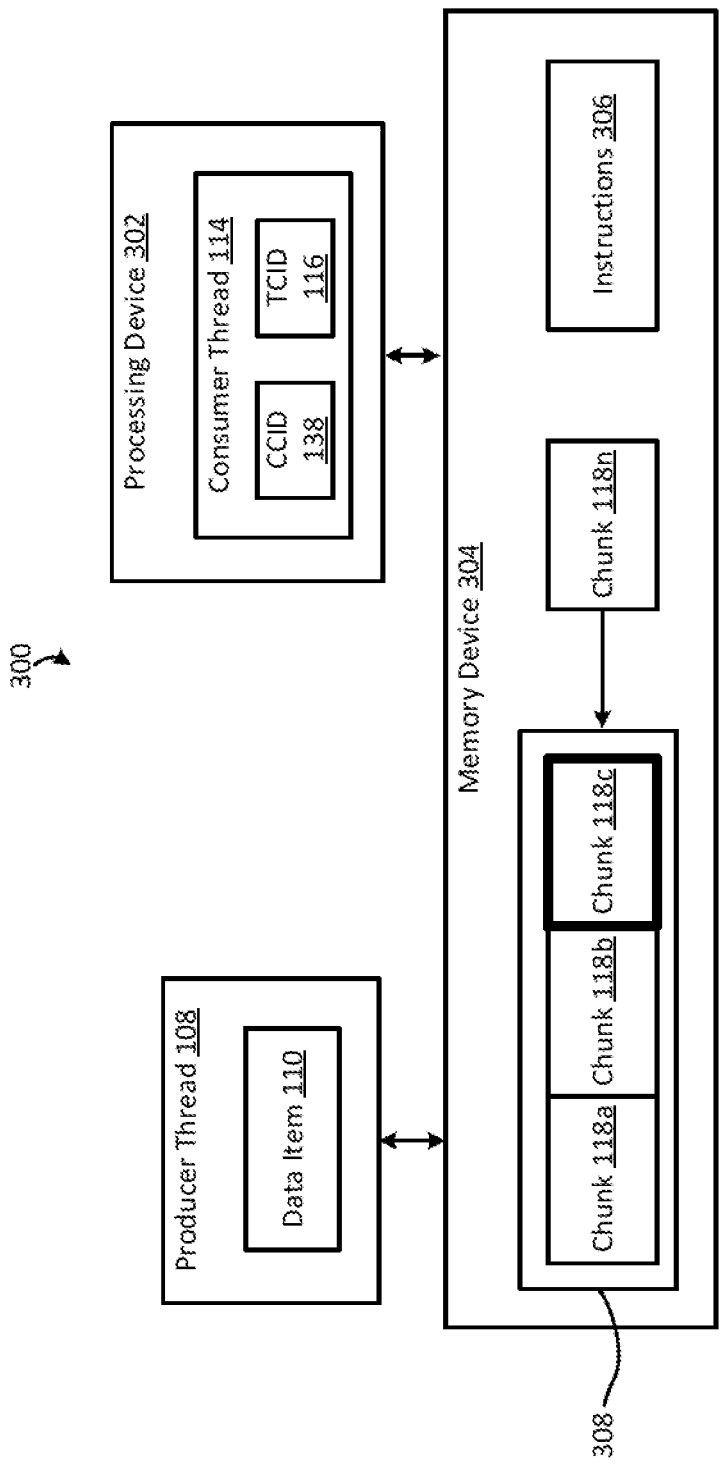
FIG. 3 is a block diagram of another example of a system for implementing consumer-assisted progressive chunking for a data queue according to some aspects of the present disclosure.

FIG. 3 is a block diagram of another example of a system 300 for implementing consumer-assisted progressive chunking for a data queue 102 according to some aspects of the present disclosure. The system 300 includes a processing device 302 communicatively coupled to a memory device 304. In some examples, the processing device 302 and the memory device 304 can be part of the same computing device, such as the node 126a of FIG. 1. In other examples, the processing device 302 and the memory device 304 can be distributed from (e.g., remote to) one another.

The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. The instructions 306 may include processor-specific instructions generated by a compiler or an interpreter from code written in any suitable computer-programming language, such as C, C++, C#, etc.

The memory device 304 can include one memory device or multiple memory devices. The memory device 304 can be non-volatile and include any type of memory device that retains stored information when powered off. Non-limiting examples of the memory device 304 can include electrically erasable and programmable read-only memory (EEPROM), flash memory, or any other type of non-volatile memory. At least some of the memory device 304 can include a non-transitory computer-readable medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processing device 302 can execute the instructions 306 to generate a consumer thread 114 that can perform some or all of the functionality described herein. In particular, the consumer thread 114 can determine a current-chunk identifier 138 indicating a current memory chunk (e.g., memory chunk 118c shown in bold) of an unbounded queue 308, where the current memory chunk is associated with a producer thread 108 that is configured to store data items in the unbounded queue 308. The unbounded queue 308 can be similar to data queue 102 of FIG. 1. In addition, the consumer thread 114 can determine a target-chunk identifier 116 indicating a target memory chunk to which the producer thread 108 is to write a data item 110. The consumer thread 114 can then compare the target-chunk identifier 116 to the current-chunk identifier 138. In response to determining that the target-chunk identifier 116 is greater than the current-chunk identifier 138, the consumer thread 114 can append a new memory chunk 118n to the data queue 102 for use as the target memory chunk by the producer thread 108. In this way, the consumer thread 114 can assist the producer thread 108 by appending the new memory chunk 118n to the data queue 102.

Figure 4:
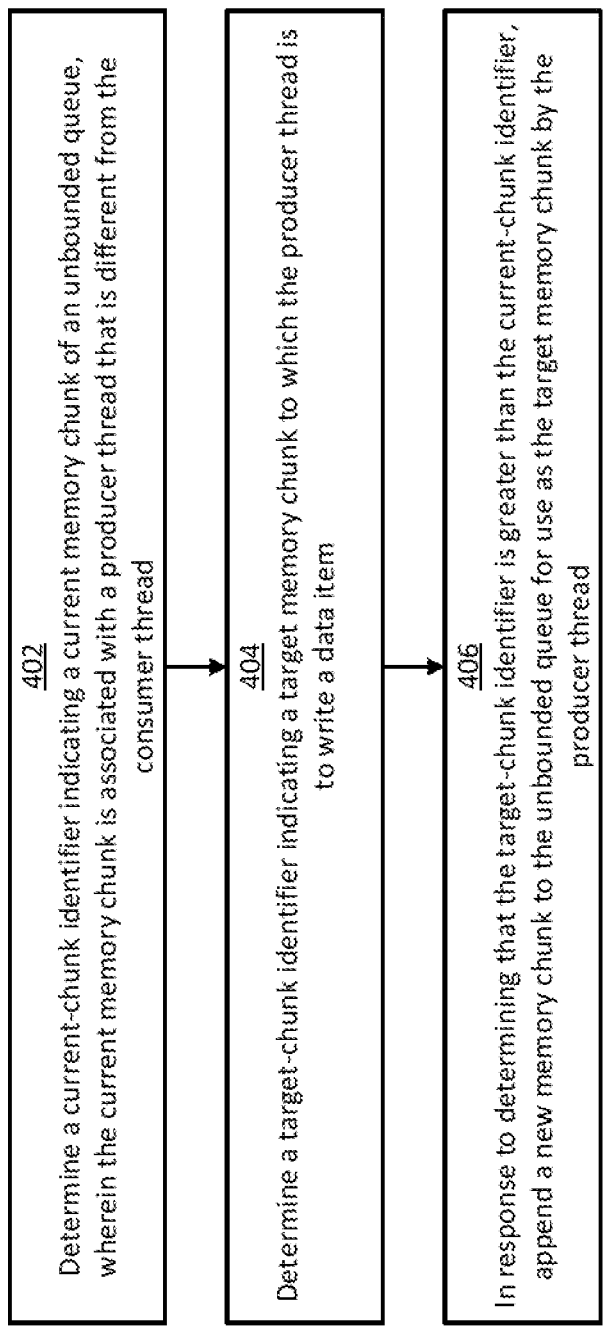
FIG. 4 a flow chart of an example of a process for implementing consumer-assisted progressive chunking for a data queue according to some aspects of the present disclosure.

In some examples, the processing device 302 can execute a consumer thread 114 to implement the process shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a consumer thread 114 determines a current-chunk identifier 138 indicating a current memory chunk of an unbounded queue 308. The current memory chunk can be associated with a producer thread 108 that is different from the consumer thread 114. In some examples, the consumer thread 114 can determine the current-chunk identifier 138 based on a producer buffer-value stored in memory. For example, the current-chunk identifier 138 can be, or can be derived from, the producer buffer-value. The producer buffer-value may be unique to the producer thread 108 or may be common among multiple producer threads. The producer buffer-value can be maintained (e.g., updated) by the producer thread 108 to reflect a current write location for the producer thread 108 in the unbounded queue 308.

In block 404, the consumer thread 114 determines a target-chunk identifier 116 indicating a target memory chunk to which the producer thread 108 is to write a data item 110. In some examples, the consumer thread 114 can determine the target-chunk identifier 116 based on a producer sequence-value stored in memory. For example, the consumer thread 114 can determine the target-chunk identifier 116 by dividing the producer sequence-value by the number of slots per memory chunk. The producer sequence-value may be unique to the producer thread 108 or may be common among multiple producer threads. The producer sequence-value may be maintained by the producer thread 108 to indicate a current write request from a software program.

In block 406, the consumer thread 114 appends a new memory chunk 118n to the data queue 102 for use as the target memory chunk by the producer thread 108, in response to determining that the target-chunk identifier 116 is greater than the current-chunk identifier 138. In this way, the consumer thread 114 can assist the producer thread 108 by appending the new memory chunk 118n to the data queue 102.

The above process can be repeated as desired. For example, the consumer thread 114 can repeat the above process at periodic intervals. As another example, the consumer thread 114 can automatically trigger the above process in response to detecting certain events, such as a blocking event on the producer side.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A processing device comprising:
a producer thread for writing data items to an unbounded queue stored in a memory, wherein the unbounded queue includes a set of memory chunks, the producer thread being configured to:
receive a write request for writing a particular data item to the unbounded queue; and
update a producer sequence-value stored in the memory to a value representing the write request;
update a producer buffer-value stored in the memory to indicate a current write location in the unbounded queue for the producer thread;
a consumer thread that is different from the producer thread, the consumer thread being for reading the data items from the unbounded queue stored in the memory, the consumer thread being configured to:
retrieve the producer buffer-value from the memory;
determine a current-chunk identifier based on the producer buffer-value, wherein the current-chunk identifier identifies the current write location for the producer thread in the unbounded queue, wherein the current-chunk identifier is a first numerical value, and the current write location is a particular memory chunk of the set of memory chunks;
retrieve the producer sequence-value from the memory;
determine a target-chunk identifier based on the producer sequence-value, wherein the target-chunk identifier identifies a target write location to which the producer thread is to write the particular data item, wherein the target-chunk identifier is a second numerical value, the target write location is different than the current write location, and the target write location corresponds to a target memory chunk;
compare the target-chunk identifier to the current-chunk identifier; and
in response to determining that the target-chunk identifier is greater than the current-chunk identifier, append a memory chunk to an end of the unbounded queue, wherein the producer thread writes the particular data item to the memory chunk after the memory chunk is appended to the unbounded queue.

2. The processing device of claim 1, wherein the producer thread is configured to update the producer sequence-value in response to write requests.

3. The processing device of claim 2, wherein the consumer thread is configured to determine the target-chunk identifier by dividing the producer sequence-value by a number of slots in the target memory chunk.

4. The processing device of claim 1, wherein the memory chunk is a reused memory chunk from a pool of memory chunks previously assigned to the unbounded queue.

5. The processing device of claim 1, wherein the consumer thread is configured to append the memory chunk to the unbounded queue by appending the memory chunk to the particular memory chunk.

6. The processing device of claim 1, wherein the producer buffer-value is a pointer to the current write location.

7. The processing device of claim 1, wherein the producer thread is a first producer thread, and further comprising a second producer thread configured to write data items to the unbounded queue.

8. The processing device of claim 1, wherein the consumer thread is configured to add the memory chunk to the unbounded queue subsequent to the producer thread receiving the write request and prior to the particular data item being written to the memory.

9. A method comprising:
receiving, by a producer thread of a processing device, a write request for writing a data item to an unbounded queue stored in a memory, wherein the unbounded queue includes a set of memory chunks;
updating, by the producer thread, a producer sequence-value stored in the memory to a value representing the write request;
updating, by the producer thread, a producer buffer-value stored in the memory to indicate a current write location in the unbounded queue for the producer thread;

retrieving, by a consumer thread of the processing device, the producer buffer-value from the memory, wherein the consumer thread is different from the producer thread;

determining, by the consumer thread, a current-chunk identifier based on the producer buffer-value, wherein the current-chunk identifier identifies the current write location for the producer thread in the unbounded queue, wherein the current-chunk identifier is a first numerical value, and the current write location is a particular memory chunk of the set of memory chunks;

retrieving, by the consumer thread, the producer sequence-value from the memory;

determining, by the consumer thread, a target-chunk identifier based on the producer sequence-value, wherein the target-chunk identifier identifies a target write location to which the producer thread is to write the data item, wherein the target-chunk identifier is a second numerical value, the target write location is different than the current write location, and the target write location corresponds to a target memory chunk;

comparing, by the consumer thread, the target-chunk identifier to the current-chunk identifier; and in response to determining that the target-chunk identifier is greater than the current-chunk identifier, appending, by the consumer thread, a memory chunk to an end of the unbounded queue, wherein the producer thread writes the data item to the memory chunk after the memory chunk is appended to the unbounded queue.

10. The method of claim 9, wherein the producer sequence-value associated with the producer thread is a counter value, and wherein updating the producer sequence-value involves incrementing the counter value.

11. The method of claim 9, further comprising:
determining, by the consumer thread, the target-chunk identifier by dividing the producer sequence-value by a number of slots per memory chunk of the unbounded queue.

12. The method of claim 9, wherein the memory chunk is a reused memory chunk from a pool of memory chunks previously assigned to the unbounded queue.

13. The method of claim 9, wherein appending the memory chunk to the unbounded queue involves appending the memory chunk to the particular memory chunk.

14. The method of claim 9, wherein the consumer thread appends the memory chunk to the unbounded queue subsequent to the producer thread receiving the write request and prior to the data item being written to the memory.

15. A non-transitory computer-readable medium comprising program code that is executable by a processing device for causing the processing device to perform operations including:

receiving, by a producer thread of the processing device, a write request for writing a data item to an unbounded queue stored in a memory, wherein the unbounded queue includes a set of memory chunks;

updating, by the producer thread, a producer sequence-value stored in the memory to a value representing the write request;

updating, by the producer thread, a producer buffer-value stored in the memory to indicate a current write location in the unbounded queue for the producer thread;

retrieving, by a consumer thread of the processing device, the producer buffer-value from the memory, wherein the consumer thread is different from the producer thread;

determining, by the consumer thread, a current-chunk identifier based on the producer buffer-value, wherein the current-chunk identifier identifies the current write location for the producer thread in the unbounded queue, wherein the current-chunk identifier is a first numerical value, and the current write location is a particular memory chunk of the set of memory chunks;

retrieving, by the consumer thread, the producer sequence-value from the memory;

determining, by the consumer thread, a target-chunk identifier based on the producer sequence-value, wherein the target-chunk identifier identifies a target write location to which the producer thread is to write the data item, wherein the target-chunk identifier is a second numerical value, the target write location is different than the current write location, and the target write location corresponds to a target memory chunk;

comparing, by the consumer thread, the target-chunk identifier to the current-chunk identifier;

in response to determining that the target-chunk identifier is greater than the current-chunk identifier, appending, by the consumer thread, a memory chunk to an end of the unbounded queue; and writing, by the producer thread, the data item to the memory chunk after the memory chunk is appended to the unbounded queue.

16. The non-transitory computer-readable medium of claim 15, wherein the memory chunk is a reused memory chunk from a pool of memory chunks previously assigned to the unbounded queue.

17. The non-transitory computer-readable medium of claim 15, wherein the operations further comprise:
determining, by the consumer thread, the target-chunk identifier by dividing the producer sequence-value by a number of slots per memory chunk of the unbounded queue.

18. The non-transitory computer-readable medium of claim 15, wherein appending the memory chunk to the unbounded queue involves appending the memory chunk to the current write location.

19. The non-transitory computer-readable medium of claim 15, wherein the operations involve:
appending, by the consumer thread, the memory chunk to the unbounded queue subsequent to the producer thread receiving the write request and prior to the data item being written to the memory.

* * * * *